W. F. SMEETH.
CLUTCH FOR WINDING ENGINES OR OTHER MACHINES.
APPLICATION FILED DEC. 30, 1914.
1,140,293.
Patented May 18, 1915.
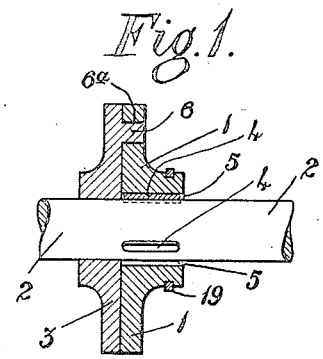
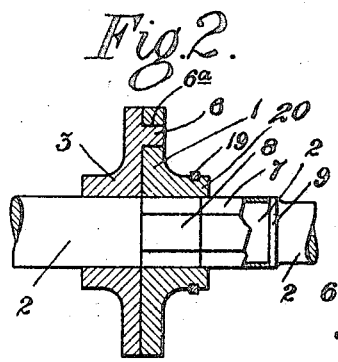
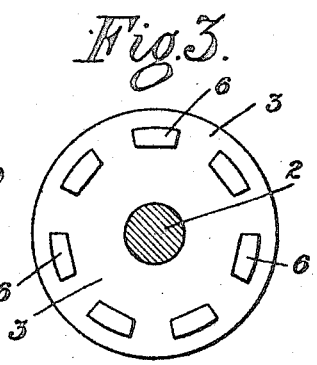
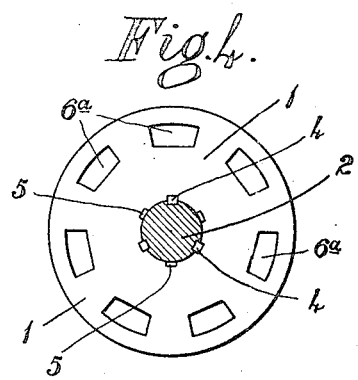
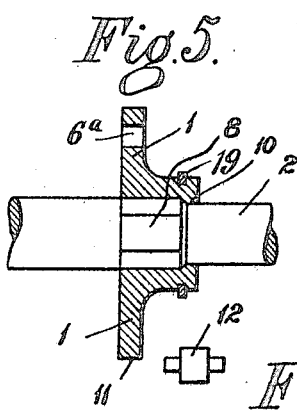
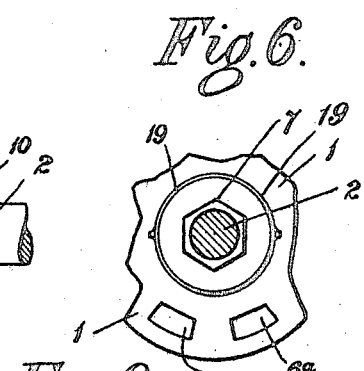
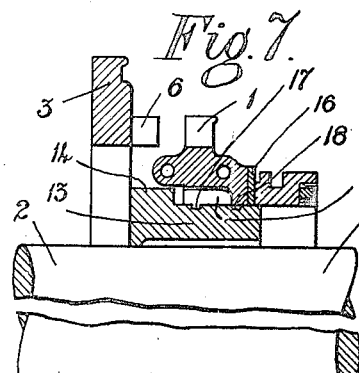
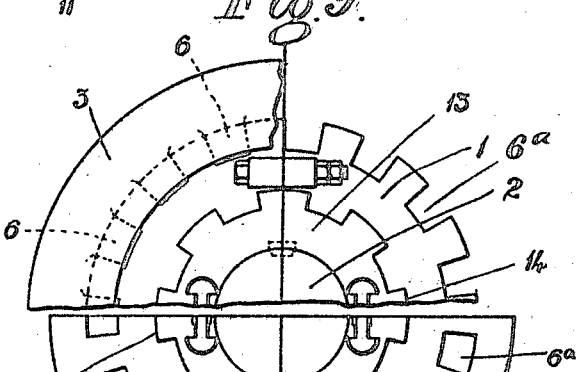
Witnesses:
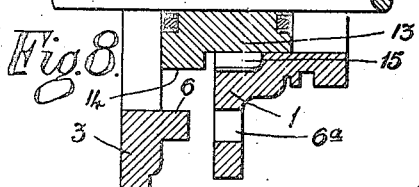
Inventor
William F. Smeeth
by
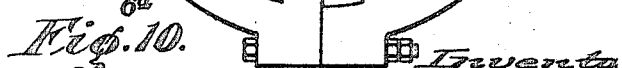
Attorney

UNITED STATES PATENT OFFICE.

WILLIAM FREDERICK SMEETH, OF BANGALUR, INDIA.

CLUTCH FOR WINDING-ENGINES OR OTHER MACHINES.

1,140,293.  Specification of Letters Patent.  Patented May 18, 1915.

Application filed December 30, 1914. Serial No. 879,760.

*To all whom it may concern:*

Be it known that I, WILLIAM FREDERICK SMEETH, a subject of the King of Great Britain, residing at Bangalur, India, have invented certain new and useful Improvements in or Relating to Clutches for Winding-Engines or other Machines, of which the following is a specification.

The present invention relates to improvements in clutches, and it is especially applicable to winding or hoisting engines employing an engine or driving shaft and cable winding drums, one of which is fixed to said shaft and the other coupled thereto by a clutch, the clutch providing means for relatively adjusting the two drums rotatably on the shaft to enable the cages suspended by the cables of the respective drums to be properly positioned at the desired levels.

The well known multiple-tooth or claw clutch is probably as good a form of connection as can be obtained between the loose drum and the engine shaft as far as security and safety in working is concerned. It has the disadvantage that in changing levels the cage cannot as a rule be set accurately at the required level owing to rotation of the drum or shaft necessary to engage the teeth of the clutch. For example, in using a clutch of the ordinary type, with a 16 feet drum and a clutch with 7 teeth, the minimum adjustment that can be made between the loose and fixed drums is 1/7th of a revolution, which means about 7 feet movement of the rope or cage, and in re-clutching at a given level the cage may be as much as half the above distance—or 3½ feet—above or below the required point. This error decreases in proportion to the number of teeth employed by the clutch *j*, but as the teeth must be large and strong for heavy work the error is always considerable and causes much inconvenience. For instance with a 16 feet drum if the clutch has 7 teeth, the maximum error amounts to 42 inches; 13 teeth, the maximum error amounts to 22.6 inches; 17 teeth, the maximum error amounts to 17.3 inches, and so on.

The new differential arrangement herein described reduces this error to a practically unimportant amount without interfering in the least with the strength and security of the clutch and without any material complication or difficulty of operation.

The principles governing the new device are;—(1) That the driving member of the clutch itself shall be capable of rotation on the engine shaft and engaged therewith in a number of different positions instead of being always in one position as in existing clutches. (2) That the number of teeth in the clutch shall not be a multiple of the number of positions into which the driving member of the clutch can be rotated, the most advantageous arrangement being that the number of teeth shall be equal to a multiple of the number of positions plus or minus 1. For example, if the driving member of the clutch can be rotated into 6 positions on the shaft (and secured at each position) the number of teeth should be 5 or 7; 11 or 13; 17 or 19; and so on according to the size of teeth required. The result of this is that the error as described above will be 1/6 of that due to the number of teeth in the clutch used in the ordinary way. For comparison with the figures above I will take the figures for a 16 feet drum with clutches having, 7, 13, 17 or 25 teeth in which the clutch can be rotated into 6 positions on the shaft.

| No. of teeth. | Error with ordinary arrangement. | Error with differential arrangement. |
|---|---|---|
| 7 | 42 inches. | 7 inches. |
| 15 | 22.6 " | 3.77 " |
| 17 | 17.3 " | 2.9 " |
| 25 | 11.7 " | 1.95 " |

In large engines, clutches of 25 or more teeth can easily be used and it is obvious that a maximum error of some 2 inches in the position of the cage is practically unimportant.

The differential movement can be easily secured in the following ways, reference being had to the annexed drawings in which;—

Figure 1 is a sectional elevation showing a toothed clutch member 1 of 7 teeth on a circular shaft or driving element 2. 3 is the clutch plate or member attached to the loose drum or driven element (not shown). Fig. 2 is a sectional elevation showing a toothed clutch in which the driving clutch member is slidable on a hexagonal portion of the driving shaft, and a hexagonal sleeve rotatable on said shaft. Figs. 3 and 4 are face views of the contact surfaces of the clutch plate and driving members of the clutch respectively. Fig. 5 is a sectional view showing a driving clutch member of modified form. Fig. 6 represents a transverse section through the shaft and the rotatable exteriorly hexagonal sleeve of Fig. 2. Figs. 7 and 8 represent half sections taken axially showing two further embodiments of the invention. Figs. 9 and 10 represent end views of the constructions shown in Figs. 7 and 8, respectively.

The driving clutch member 1 is held in position by keys 4 and has 6 key ways 5 as shown in Fig. 4. There may be 1, 2 or 3 or more keys or feathers.

Sufficient room is left on the shaft 2 to slide the driving clutch member back clear of the teeth 6 from the holes 6ª and also clear of the keys 4, the driving clutch member 1 can then be rotated on the shaft 2 and put back in any of six positions.

In using the ordinary type of clutch having 7 teeth, a relative rotation of 1/7th of a revolution is the minimum adjustment obtainable between the driving and driven clutch members. According to the present invention, however, the driving clutch member is capable of being connected in any one of a plurality of driving positions on the driving shaft, and as this driving clutch member may be connected to the driving shaft in any one of six driving positions, it is obvious that the two adjustments provided enable the driven element to be connected to the driving shaft in any one of 42 different positions, which means that a relative adjustment may be secured between the driving shaft and the driven element or winding drum equal to 1/42d of a revolution.

If the driving clutch member be mounted on a hexagonal shaft as shown in detail elevation and transverse section respectively Figs. 2 and 6, it is only necessary to provide a loose hexagonal sleeve 7 on to which the clutch can slide back and on which it can be rotated. Of course the driving clutch member could be slid back off the hexagonal portion on to the circular part of the shaft and then rotated but this would not be a very good arrangement as it would mean the rotation of a hexagon on a circle. I therefore provide the following arrangement. 8 is the solid hexagonal part of the shaft 2 on which the clutch 1 slides. Immediately to the right the shaft is turned down slightly, a collar 9 being left on, or may be put on afterward. Between 8 and 9 the shaft is covered with a sleeve 7 of steel, brass, gunmetal or other suitable metal which has a cylindrical bore fitting the shaft 2 and is hexagonal on the outside so as to fit the clutch.

A rear view of the clutch, with the sleeve 7 and the shaft 2 in section, is shown in Fig. 6.

When the clutch is fully engaged the end of its boss overlaps the sleeve 7 by say a couple of inches. When the clutch has to be rotated it is slid back off 8 completely on to the sleeves 7 where it (and the sleeve) can be rotated on the shaft. After the proper rotation the faces of 8 and 7 are brought parallel and the clutch again slid on to 8.

Fig. 5 shows another arrangement in which the boss of the driving clutch member 1 bears on a circular part of the shaft at 10 while the rim portion 11 of the clutch 1 rides on to rollers at 12 as the clutch member comes off the hexagonal part of the shaft. The driving clutch member is moved to and fro along the shaft by a rocking lever (not shown) acting on the slip ring 19 this device being applicable also to the other arrangements shown. All of these arrangements mean that the clutch has to slide back some 18″ or 2 feet in order to clear the keys or the hexagonal boss. Also the keys are a relatively weak part and liable to wear loose.

The following arrangement gets over these defects and is mechanically better;— see Figs. 7 and 8. A heavy sleeve 13 is shrunk on to the shaft, the end of the sleeve carries large heavy teeth 14 which fit or mesh with internal teeth 15 on the clutch 1. In order to rotate the driving clutch member it is only necessary to slide it back far enough to clear the internal teeth 15 from the teeth 14. The number of internal teeth can be more than six and the fineness of the differential adjustment proportionately increased.

Figs. 7, 8 9 and 10 show the arrangement for a clutch having 15 external and 8 internal teeth which for a 16 feet drum permits a movement of the rope of 4 ⁀ inches or a maximum error in the position of the cage of 2.45 inches. If there are 25 external teeth these figures will be reduced to 2.94, and 1.47 inches respectively.

Fig. 7 and Fig. 9 show a clutch with open teeth and Fig. 8 and Fig. 10 show a clutch with shrouded teeth. The latter is probably the stronger arrangement and permits of the projecting teeth on the clutch plate 3 being made somewhat wider while the teeth of the clutch member 1 are correspondingly reduced in size.

The clutch is provided with spring locking bolts 16 sliding on the back of the clutch member 1, when the clutch 1 is fully engaged 16 drops into a groove 17 in the sleeve. To change levels the bolts 16 are raised and the clutch member 1 slid back 6½ inches when the bolts drop into groove 18. After the necessary rotation of the engine required for the change of level it may be necessary to rotate the clutch member 1 to permit of reëngagement with the minimum error; if so the bolts 16 are raised and the clutch slid back to the position shown in Figs. 7 or 8. A very slight movement of the engine will then cause the teeth to reëngage and the bolts 16 will drop into the groove 17 and lock the clutch.

The teeth on the sleeve 13 are about 8″ long so that a movement of some 9″ is sufficient to completely free the clutch member on the shaft and permit of its rotation.

In the drawings the projecting teeth are shown on the clutch plate 3 and the open teeth on the clutch member 1 itself which is the reverse of the usual practice; the object of this is that when the projecting teeth wear and develop a certain amount of play, thin liners or strips of steel can be placed around the clutch teeth and buckled at the back of the plate thus taking up wear and reducing rattling or jarring to a minimum. It is claimed that this clutch has the advantages of a safe and reliable connection between the engine and the loose drum which is afforded by a large number of large strong teeth while at the same time the error in reëngaging is reduced to practically negligible amount. For convenience of fixing, both clutch and sleeve may be made in halves.

I declare that what I claim as my invention and desire to secure by Letters Patent is:—

1. In clutches for winding engines, the combination of driving and driven elements, toothed clutch members coöperative with the respective elements and relatively movable in a direction toward or from one another to engage and disengage them, and means between one of the clutch members and its respective element for connecting such clutch member in different positions of rotation relatively to said element.

2. In clutches for winding engines, the combination of driving and driven elements, toothed clutch members coöperative with the respective elements and movable relatively toward and from one another, said clutch members being capable of engagement in a plurality of positions of relative rotation, and means for connecting one of said clutch members to its respective element in a number of positions which is not a multiple of the number of positions of engagement of the clutch members.

3. In clutches for winding engines, the combination of driving and driven elements, a clutch member connected to one of said elements, and a coöperative clutch member on the other element shiftable to connect and disconnect it relatively thereto and to the clutch member first mentioned and also capable of being rotated and engaged in different relations relatively to the element carrying it and to the clutch member first mentioned.

4. In clutches for winding engines, the combination of driving and driven elements, a toothed clutch member connected to one of said elements, and a coöperating toothed clutch member shiftable relatively to the other element to connect and disconnect it relatively thereto and to the clutch member first mentioned and also rotatable relatively to its respective element to engage it in different driving relations therewith and with the clutch member first mentioned.

5. In clutches for winding engines, the combination with driving and driven elements, of toothed clutch members capable of engaging one another in a plurality of positions of relative rotation and relatively movable toward and from one another to engage and disengage one another, and a connection between one of the clutch members and its respective element whereby said clutch member may be connected in a plurality of positions of relative rotation on said element, said connection being disengaged by relative separation of the clutch members.

6. In clutches of the character described, the combintaion of a driving shaft, an element to be driven thereby, a toothed clutch member connected to said element, a coöperating toothed clutch member movable axially of said shaft to engage and disengage the clutch member first mentioned, and means on said shaft for connecting said movable member thereto when such clutch member is engaged with the clutch member first mentioned and permitting rotation of the movable clutch member on said shaft when said movable clutch member is disengaged from the clutch member first mentioned.

In testimony whereof I have hereunto set my hand in presence of two subscribing witnesses.

WILLIAM FREDERICK SMEETH.

Witnesses.
 A. R. Cox,
 K. Subbnian.